(12) United States Patent
Matsumura et al.

(10) Patent No.: US 12,476,690 B2
(45) Date of Patent: Nov. 18, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 380 days.

(21) Appl. No.: 18/041,925

(22) PCT Filed: Aug. 28, 2020

(86) PCT No.: PCT/JP2020/032743
§ 371 (c)(1),
(2) Date: Feb. 16, 2023

(87) PCT Pub. No.: WO2022/044287
PCT Pub. Date: Mar. 3, 2022

(65) Prior Publication Data
US 2023/0327742 A1    Oct. 12, 2023

(51) Int. Cl.
*H04B 7/06* (2006.01)
(52) U.S. Cl.
CPC ................ *H04B 7/06968* (2023.05)
(58) Field of Classification Search
CPC ...... H04L 5/0064; H04L 5/005; H04W 72/04; H04B 7/06968
See application file for complete search history.

(56) References Cited

U.S. PATENT DOCUMENTS

2019/0253904 A1    8/2019  Tsai et al.
2020/0351682 A1*  11/2020  Cirik ................ H04W 76/28
(Continued)

FOREIGN PATENT DOCUMENTS

CN    110366865 A    10/2019
CN    111148260 A     5/2020
(Continued)

OTHER PUBLICATIONS

Office Action issued in Chinese Application No. 202080106679.6, mailed Jul. 31, 2024 (17 pages).
(Continued)

*Primary Examiner* — Phong La
(74) *Attorney, Agent, or Firm* — Osha Bergman Watanabe & Burton LLP

(57) ABSTRACT

A terminal according to one aspect of the present disclosure includes a control section that, if scheduling offset between reception of a downlink control channel for communication of downlink control information for scheduling an aperiodic channel state information-reference signal (A-CSI-RS) and reception of the A-CSI-RS is less than a threshold determined on the basis of a reported period value for beam switch, and there is a different downlink signal in the same symbol as the A-CSI-RS, and the A-CSI-RS and the different downlink signal are related to the same control resource set (CORESET) pool index, gives priority to quasi-co-location (QCL) for the different downlink signal; and a receiving section that receives the A-CSI-RS. According to one aspect of the present disclosure, collision between a plurality of channels/signals can be handled appropriately.

6 Claims, 10 Drawing Sheets

(56) References Cited

U.S. PATENT DOCUMENTS

| | | | |
|---|---|---|---|
| 2020/0404690 A1* | 12/2020 | Lee | H04L 5/005 |
| 2021/0259003 A1 | 8/2021 | Hang et al. | |
| 2021/0360594 A1* | 11/2021 | Park | H04L 5/0048 |
| 2021/0385826 A1* | 12/2021 | Moon | H04L 1/0046 |
| 2022/0131642 A1* | 4/2022 | Kim | H04L 5/005 |
| 2023/0283436 A1* | 9/2023 | Bhamri | H04L 27/0008 370/329 |
| 2023/0327742 A1* | 10/2023 | Matsumura | H04B 7/06968 370/329 |

FOREIGN PATENT DOCUMENTS

| | | | | |
|---|---|---|---|---|
| WO | WO-2020029725 A1 * | 2/2020 | | H04L 5/001 |
| WO | WO-2020138983 A1 * | 7/2020 | | |
| WO | WO-2020145794 A1 * | 7/2020 | | H04L 5/0048 |
| WO | WO-2021029754 A1 * | 2/2021 | | H04B 7/0408 |

OTHER PUBLICATIONS

Written Opinion issued in Application No. PCT/JP2020/032743 mailed on Apr. 6, 2020, (3 pages).

ZTE, "Maintenance of multi-TRP enhancements", 3GPP TSG RAN WG1 Meeting #102-e, R1-2005451, e-Meeting, Aug. 17-28, 2020 (14 pages).

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).

International Search Report issued in Application No. PCT/JP2020/032743 mailed on Apr. 6, 2020, (3 pages).

* cited by examiner

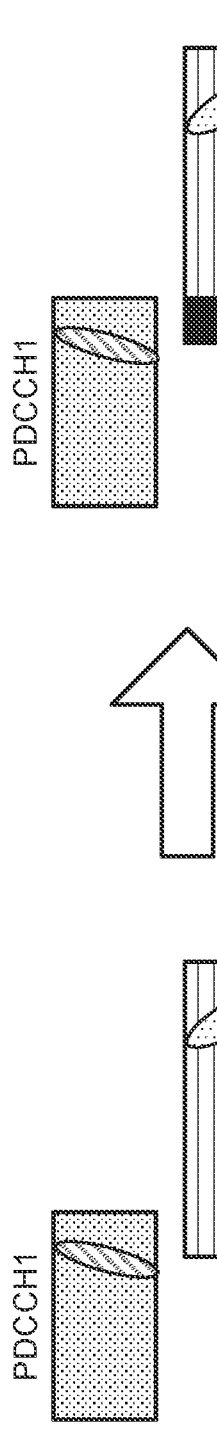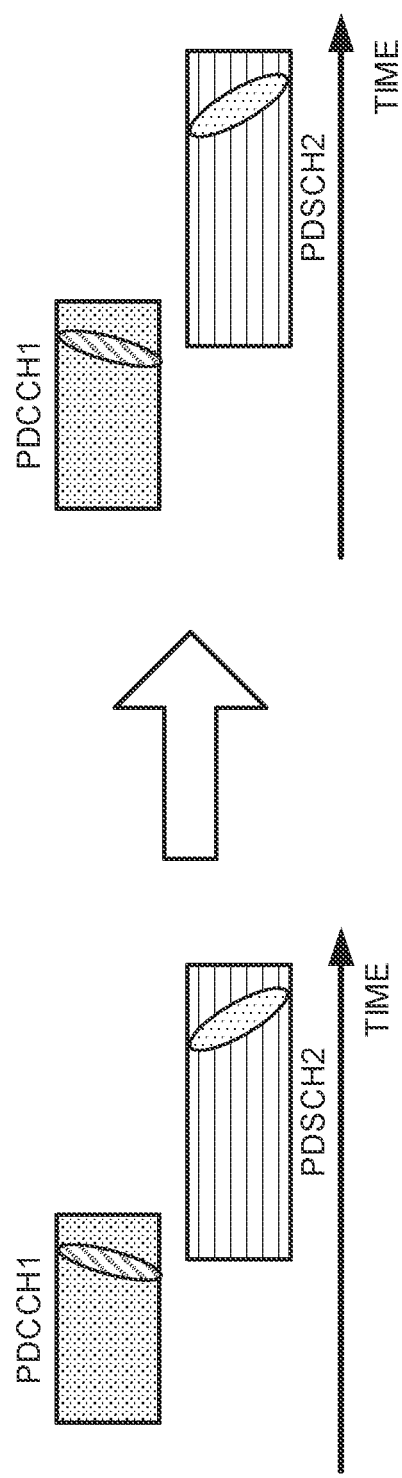
FIG. 3A
FIG. 3B

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

The specifications of Rel. 15/16 NR applied so far include constraints (may be referred to as a priority rule) defined in such a manner as to make a plurality of channels/signals surely fall under the same quasi-co-location (QCL) type D in the case of collision between these channels/signals, or to avoid such a case.

According to NR, consideration has been given to making DL transmission from one or a plurality of transmission/reception points (TRPs) (multi-TRP (MTRP)) to UE. Consideration has also been given to making UL transmission from the UE to one or the plurality of TRPs.

The UE using control based on the MTRP is to have capability to receive a plurality of beams (a plurality of QCL type D channels/signals) simultaneously. Easing the constraints (priority rule) on the collision between a plurality of channels/signals described above is considered to be possible for such UE. However, enough consideration has not been given to these constraints imposed if the UE is capable of receiving a plurality of beams (a plurality of QCL type D channels/signals) simultaneously. Not giving consideration to this issue may limit transmission/reception by the UE inappropriately to cause the likelihood of reducing throughput or degrading communication quality.

Thus, one object of the present disclosure is to provide a terminal, a radio communication method, and a base station capable of handling collision between a plurality of channels/signals appropriately.

Solution to Problem

A terminal according to one aspect of the present disclosure includes: a control section that performs control of receiving both a downlink shared channel (Physical Downlink Shared Channel (PDSCH)) and a downlink control channel (Physical Downlink Control Channel (PDCCH)) overlapping each other if a specific condition is satisfied; and a receiving section that gives priority to reception of the PDCCH if the specific condition is not satisfied.

Advantageous Effects of Invention

According to one aspect of the present disclosure, collision between a plurality of channels/signals can be handled appropriately.

BRIEF DESCRIPTION OF DRAWINGS

FIGS. 3A and 3B are diagrams to show examples of a priority rule applied on the occurrence of collision between a PDCCH and a PDSCH according to the embodiment 1.1;

Figure 1:
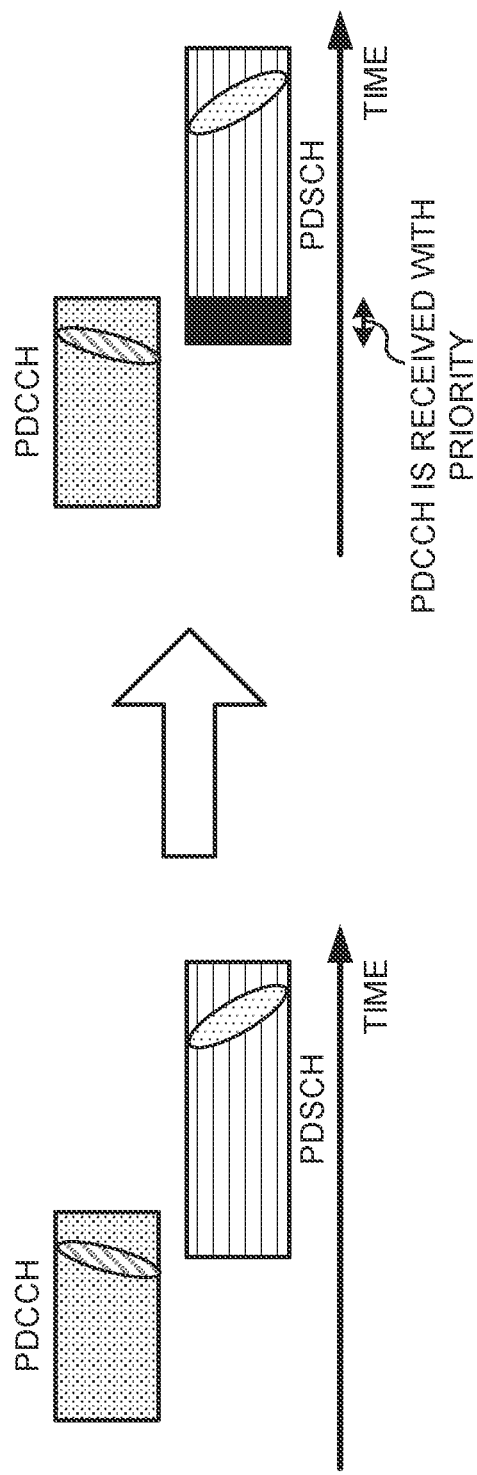
FIG. 1 is a diagram to show an example of a priority rule applied on the occurrence of collision between a PDCCH and a PDSCH according to the existing specifications of Rel. 16.

DESCRIPTION OF EMBODIMENTS (TCI, Spatial Relation, QCL)

According to NR, consideration has been given to controlling reception processing (at least one of reception, de-mapping, demodulation, and decoding, for example) and transmission processing (at least one of transmission, mapping, precoding, modulation, and coding, for example) on the basis of a transmission configuration indication state (TCI state) that are performed at UE on at least one of a signal and a channel (expressed as a signal/channel).

The TCI state may indicate a state applied to a downlink signal/channel. A state corresponding to the TCI state applied to an uplink signal/channel may be expressed as a spatial relation.

The TCI state is information about quasi-co-location of a signal/channel and may be referred to as a spatial reception parameter, spatial relation information, and so on. The TCI state may be configured in UE for each channel or each signal.

QCL is an index indicating a statistical property of a signal/channel. For example, the presence of a QCL relation between a given signal/channel and a different signal/channel may mean that a supposition can be made that these different signals/channels are common in terms of at least one of Doppler shift, Doppler spread, average delay, delay spread, and a spatial parameter (spatial reception parameter (spatial Rx parameter), for example) (quasi-co-located (QCL) in terms of at least one of these elements).

Note that the spatial reception parameter may correspond to a reception beam (a reception analog beam, for example) at the UE. In another case, a beam may be specified on the basis of spatial QCL. In the present disclosure, QCL (or at least one element of the QCL) may be interpreted as sQCL (spatial QCL).

There may be a plurality of types defined for QCL (QCL types). For example, there may be four QCL types A to D differing from each other in a parameter that can be supposed to be common. The following shows such a parameter (may be referred to as a QCL parameter):

QCL type A (QCL-A): Doppler shift, Doppler spread, average delay, and delay spread;
QCL type B (QCL-B): Doppler shift and Doppler spread;
QCL type C (QCL-C): Doppler shift and average delay; and
QCL type D (QCL-D): Spatial reception parameter.

If the UE assumes that a given control resource set (CORESET), a channel, or a reference signal has a specific QCL (QCL type D, for example) relation with a different CORESET, channel, or reference signal, this assumption may be referred to as QCL assumption.

The UE may determine at least one of a transmission beam (Tx beam) and a reception beam (Rx beam) of a signal/channel on the basis of a TCI state or QCL assumption for this signal/channel.

The TCI state may be information about QCL between a target channel (in other words, a reference signal (RS) for this channel) and a different signal (a different RS, for example). The TCI state may be configured (indicated) using higher layer signaling or physical layer signaling, or a combination thereof.

Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC Protocol Data Units (PDUs), and the like. For example, the broadcast information may be master information blocks (MIBs), system information blocks (SIBs), minimum system information (Remaining Minimum System Information (RMSI)), other system information (OSI), and the like.

The physical layer signaling may be downlink control information (DCI), for example.

Note that a channel/signal as a target of application of a TCI state may be referred to as a target channel/reference signal (target channel/RS), simply as a target, and so on. The above-described different signal may be referred to as a reference signal (reference RS), as a source RS, simply as a reference, and so on.

A channel with a configured (indicated) TCI state or spatial relation may be at least one of a downlink shared channel (Physical Downlink Shared Channel (PDSCH)), a downlink control channel (Physical Downlink Control Channel (PDCCH), an uplink shared channel (Physical Uplink Shared Channel (PUSCH)), or an uplink control channel (Physical Uplink Control Channel (PUCCH)), for example.

An RS QCL-related with this channel may be at least one of a synchronization signal block (SSB), a channel state information reference signal (CSI-RS), a sounding reference signal (SRS), a tracking CSI-RS (also referred to as a tracking reference signal (TRS)), a QCL detection reference signal (also referred to as a QRS), and a demodulation reference signal (DMRS)), for example.

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of a QCL type X with a TCI state may mean an RS related in terms of the QCL type X with a given channel/signal (a DMRS therefor). This RS may be referred to as a QCL source of the QCL type X with this TCI state.

(Collision Between Plurality of Channels/Signals)

According to the specifications of Rel. 15/16 NR applied so far, while UE is allowed to receive, detect, or monitor only channels/signals of the same QCL type D in the same time period, it is not allowed to receive, detect, or monitor a plurality of channels/signals of different QCL types D in the same time period. For this reason, the specifications of Rel. 15/16 NR include constraints (may be referred to as a priority rule, a QCL-applied rule, and so on) described below defined in such a manner as to make a plurality of channels/signals surely fall under the same QCL type D in the case of collision between these channels/signals (in other words, these channels/signals are to be transmitted/received in an overlapping time period), or to avoid such a case.

Note that, in the present disclosure, the presence of a difference between the QCL type D (a reference RS thereof) of a given channel/signal and the QCL type D (a reference RS thereof) of a different channel/signal may mean that a beam used for communication of the given channel/signal and a beam used for communication of the different channel/signal differ from each other. In the present disclosure, the presence of a difference between QCL type D (a reference RS thereof) of a given channel/signal and the QCL type D (a reference RS thereof) of a different channel/signal may mean that the respective QCL types D of the given channel/signal and the different channel/signal differ from each other, the characteristics of these QCL types D differ from each other, or there is a difference in "QCL type D."

<PDCCH vs. PDCCH>

If the UE is configured to perform single cell operation or configured to perform carrier aggregation operation in the same frequency band, and if PDCCH candidates are to be monitored using overlapping monitoring occasions in a plurality of CORESETs with a QCL type D characteristic same or differing in a BL BWP in which one or more cells are active, only a given PDCCH on a CORESET of these CORESETs and only a PDCCH on a CORESET having the same QCL type D characteristic as the given CORESET are monitored.

<PDCCH vs. PDSCH>

If offset between reception of DL DCI and a corresponding PDSCH (may be referred to as scheduling offset) is less than a given threshold (timeDurationForQCL), the UE may assume that a DMRS port for a PDSCH of a given serving cell is quasi-co-located (QCL) with a reference signal relating to a QCL parameter for a PDCCH on a CORESET having a minimum CORESET ID (controlResourceSetId)

associated with a search space to be monitored in the latest slot for monitoring of one or more CORESETs in an active BWP of this serving cell. In this case, this PDSCH may be expressed as a PDSCH complying with a default TCI state or as a PDSCH referring/assuming a default QCL, for example.

If the PDSCH complies with the default TCI state and if "QCL type D (a signal thereof)" of a DMRS for this PDSCH differs from a "QCL type D (a signal thereof)" ('QCL-TypeD') of a DMRS for a PDCCH overlapping this PDSCH in at least one symbol, the UE may expect that priority will be given to reception of a PDCCH associated with a CORESET. Note that these operations may be applied to the case of in-band carrier aggregation (carrier aggregation (CA)) (to a case where the above-described PDSCH and CORESET are in different component carriers).

FIG. 1 is a diagram to show an example of a priority rule applied on the occurrence of collision between a PDCCH and a PDSCH according to the existing specifications of Rel. 16. The PDSCH of the present example complies with a default TCI state. The left side of the drawing shows a channel/signal to be scheduled, and the right side of the drawing shows a channel/signal resulting from giving consideration to the priority rule (this applies to similar drawings referred to later).

In the present example, the PDCCH and the PDSCH shown in the drawings differ from each other in the QCL type D and overlap each other in some symbols. In this case, the UE receives the PDCCH as a priority and does not need to receive the PDSCH overlapping the PDCCH (in the drawing, a blackened part) (by dropping, for example).

The UE may receive the PDSCH in a part not overlapping the PDCCH.

<CSI-RS vs. PDCCH>

Regarding a CSI-RS resource associated with a non zero power (NZP)-CSI-RS resource set in which a higher layer parameter about repetition ('repetition') is 'on,' the UE does not assume configuration of a CSI-RS in a symbol configured to monitor a CORESET (that is, the CORESET and the CSI-RS resource in this case do not overlap each other temporally).

Regarding an NZP-CSI-RS resource set not applied to this case (if 'repetition' is not 'on'), if a CSI-RS resource and a search space set associated with a CORESET are configured in the same OFDM symbol, the UE may assume that this CSI-RS and a DMRS for a PDCCH to be transmitted in all search space sets associated with a CORESET are quasi-co-located (QCL) according to "QCL type D" (if "QCL type D" is applicable). In other words, regarding a CSI-RS in which repetition is not on, the UE may assume the same QCL as that for an overlapping PDCCH (CORESET). Note that these operations may be applied to the case of in-band CA (to a case where the above-described CSI-RS and CORESET are in different component carriers).

No that, in the present disclosure, an OFDM symbol and a symbol may be interchangeably interpreted.

<CSI-RS vs. SSB>

If a CSI-RS resource associated with an NZP-CSI-RS resource set configured with a higher layer parameter about repetition ('repetition') is configured in the same OFDM symbol as an SS/PBCH block at the UE, this UE may assume that these CSI-RS and SS/PBCH block are quasi-co-located (QCL) according to "QCL type D" (if "QCL type D" is applicable). In other words, regarding a CSI-RS configured with the higher layer parameter about repetition, the UE may assume the same QCL as that for an overlapping SS/PBCH block.

<PDSCH vs. SSB>

If an SS/PBCH block and a DMRS for a PDSCH are to be received in the same OFDM symbol, the UE may assume that these DMRS and SS/PBCH block are quasi-co-located (QCL) according to "QCL type D" (if "QCL type D" is applicable). In other words, regarding the PDSCH, the UE may assume the same QCL as that for an overlapping SS/PBCH block.

<A-CSI-RS vs. Different DL Signal>

According to the specifications of Rel. 16 NR, if scheduling offset of an aperiodic CSI-RS (A-CSI-RS) is equal to or greater than a threshold determined on the basis of beam switch timing reported by the UE, the UE may be (is) expected to apply the QCL assumptions in the indicated TCI states for the A-CSI-RS (aperiodic CSI-RS) resources in the CSI triggering state indicated by the CSI trigger (request) field in DCI. That is, in this case, the UE may receive the A-CSI-RS on the basis of the TCI state indicated by the DCI.

The above-described scheduling offset may mean offset between the last symbol in a PDCCH for communication of DCI to trigger a resource set for the A-CSI-RS (or the last slot including this PDCCH) and the first symbol (or slot) in an A-CSI-RS resource in this resource set. This offset may be expressed in a unit that may be a symbol or a slot. Information about the scheduling offset of the A-CSI-RS may correspond to "aperiodicTriggeringOffset" in an RRC parameter.

The beam switching timing (UE capability relating to this timing) reported by the UE may be referred to as A-CSI-RS beam switching timing, simply as beam switching timing, beam switch timing (RRC parameter "beamSwitchTiming"), and so on.

The beam switch timing may take a value differing between subcarrier spacings (60 kHz or 120 kHz, for example). The beam switch timing can take a value such as 14, 28, 48, 224, or 336 symbols, for example.

A threshold determined on the basis of the beam switch timing may be a value of the reported beam switch timing, a specific value of beam switch timing (48, for example), or a value obtained by adding given offset (offset giving consideration to a subcarrier spacing) to these values.

If scheduling offset of an A-CSI-RS is less than the threshold determined on the basis of the beam switch timing reported by the UE, and if there is a different DL signal having an indicated TCI state in the same symbol as this A-CSI-RS, the UE may apply QCL assumption for this different DL signal during reception of this A-CSI-RS. An intention of such specifications is that, as it takes a given period of time from demodulation of triggering DCI to switching of a reception beam for the UE responsive to a TCI state indicated by this DCI, the occurrence of failing to finish the switching before reception of the A-CSI-RS should be reduced.

Note that the different DL signal mentioned here may be at least one of a PDSCH having scheduling offset of equal to or greater than the given threshold (UE capability information "timeDurationForQCL") (that is, offset from reception of DCI to start of reception of a PDSCH to be scheduled using the received DCI is equal to or greater than the given threshold), an A-CSI-RS having scheduling offset of equal to or greater than the threshold determined on the basis of the beam switch timing reported by the UE (that is, another A-CSI-RS), a P-CSI-RS, and an SP-CSI-RS.

For definition of timeDurationForQCL, a minimum time period (the number of OFDM symbols, for example) in which the UE receives a PDCCH and spatial QCL information about the received PDCCH (DCI) is applied for processing a PDSCH may be used.

The name for timeDurationForQCL may include a time length for QCL (time duration), "threshold," "Threshold for offset between DCI indicating a TCI state and a PDSCH scheduled by the DCI," "Threshold-Sched-Offset," a schedule offset threshold, a scheduling offset threshold, and so on. For example, timeDurationForQCL can take a value such as 7, 14, or 28 symbols.

Note that, in the present disclosure, a threshold about the different DL signal may correspond to beam switch timing if this different DL signal is an A-CSI-RS, and may correspond to a value of timeDurationForQCL reported by the UE if the different DL signal is a PDSCH.

Note that the QCL assumption for the different DL signal described above may be made applicable to an A-CSI-RS in a limited case where an NZP CSI-RS resource set defining this A-CSI-RS resource does not have higher layer parameters "trs-Info" and "repetition."

An NZP CSI-RS resource set in which trs-Info is configured as true may be such that antenna ports of all NZP CSI-RS resources of this resource set are the same. An NZP CSI-RS resource set in which Repetition is configured as off may be such that the UE does not assume an NZP CSI-RS resource in this resource set to be transmitted in the same downlink spatial domain transmission filter.

Note that, if scheduling offset of an A-CSI-RS is less than the threshold determined on the basis of the beam switch timing reported by the UE, if the above-described different DL signal having an indicated TCI state is absent in the same symbol as this A-CSI-RS, and if at least one CORESET is configured in a BWP in which this A-CSI-RS is to be received, the UE may apply (applies) the QCL assumption used for the CORESET associated with a monitored search space with the lowest CORESET-ID (controlresourceSetId) in the latest slot in which one or more CORESETs within the active BWP of the serving cell are monitored during reception of this A-CSI-RS.

Note that scheduling offset of an A-CSI-RS is less than the threshold determined on the basis of the beam switch timing reported by the UE, if the above-described different DL signal having an indicated TCI state is absent in the same symbol as this A-CSI-RS, if a CORESET is not configured in a BWP in which this A-CSI-RS is to be received, and if a specific higher layer parameter (for example, an RRC parameter for enabling a default beam (may be referred to as enableDefaultBeamForCCS, and so on) is configured, the UE may apply QCL assumption for a TCI state corresponding to the lowest TCI state ID to be activated applicable to a PDSCH in an active BWP in which this A-CSI-RS is to be received during reception of this A-CSI-RS.

<Multi TRP>

By the way, according to NR, consideration has been given to making DL transmission from one or a plurality of transmission/reception points (TRPs) (Multi-TRP (MTRP)) to the UE. Consideration has also been given to making UL transmission from the UE to one or the plurality of TRPs.

The UE using control based on the MTRP is to have capability to receive a plurality of beams (a plurality of QCL type D channels/signals) simultaneously. Easing the constraints (priority rule) on the collision between a plurality of channels/signals described above is considered to be possible for such UE. However, enough consideration has not been given to these constraints imposed if the UE is capable of receiving a plurality of beams (a plurality of QCL type D channels/signals) simultaneously. Not giving consideration to this issue may limit transmission/reception by the UE inappropriately to cause the likelihood of reducing throughput or degrading communication quality.

Then, the inventors of the present invention came up with the idea allowing handling of collision between a plurality of channels/signals appropriately.

Embodiments according to the present disclosure will be described in detail with reference to the drawings as follows. The radio communication method according to each embodiment may be employed independently or may be employed in combination.

In the present disclosure, the phrase "A/B" may mean that "at least one of A and B."

In the present disclosure, activate, deactivate, specify (or indicate), select, configure, update, determine, and so on may be interchangeably interpreted.

In the present disclosure, an RRC, an RRC parameter, an RRC message, higher layer parameter, information element (IE), and configuration may be interchangeably interpreted. In the present disclosure, MAC, CE, ab update command, and an activation/deactivation command may be interchangeably interpreted. In the present disclosure, to support, to control, to be capable of controlling, to operate, and to be capable of operating may be interchangeably interpreted.

In the present disclosure, a sequence, a list, a set, a group, a family, and so on may be interchangeably interpreted.

In the present disclosure, a panel, a beam, a panel group, a beam group, an uplink (UL) transmission entity, a TRP, spatial relation information (SRI), spatial relation, a control resource set (a CORESET), a Physical Downlink Shared Channel (PDSCH), a code word, a base station, a given antenna port (for example, a demodulation reference signal (DMRS) port), a given antenna port group (for example, a DMRS port group), a given group (for example, a code division multiplexing (CDM) group), a given reference signal group, a CORESET group), a given resource (for example, a given reference signal resource), a given resource set (for example, a given reference signal resource set), a CORESET pool, a PUCCH group (a PUCCH resource group), a spatial relation group, a downlink TCI state (a DL TCI state), an uplink TCI state (a UL TCI state), a unified TCI state, and so on may be interchangeably interpreted.

A panel may be associated with at least one of a group index of an SSB/CSI-RS group, a group index of group base beam report, and a group index of an SSB/CSI-RS group for group base beam report.

A panel identifier (ID) and a panel may be interchangeably interpreted. That is, interchangeable interpretation may be made between a TRP ID and a TRP, between a CORESET group ID and a CORESET group, and so on.

In the present disclosure, an index, an ID, an indicator, and a resource ID may be interchangeably interpreted. In the present disclosure, a sequence, a list, a set, a group, a family, a cluster, a subset, and so on may be interchangeably interpreted.

In the present disclosure, UE configured with a plurality of TRPs may judge at least one of a TRP corresponding to DCI, a TRP corresponding to a PDSCH to be scheduled by DCI or UL transmission (such as a PUCCH, a PUSCH, and an SRS), and so on, on the basis of at least one of the following:

A value of a given field (for example, a field indicating a TRP, an antenna port field, a PRI) included in DCI;

A DMRS corresponding to a PDSCH/PUSCH to be scheduled (for example, a sequence of this DMRS, a resource, a CDM group, a DMRS port, a DMRS port group, an antenna port group, and so on);

A DMRS corresponding to a PDCCH for which DCI has been transmitted (for example, a sequence of this DMRS, a resource, a CDM group, a DMRS port, a DMRS port group, and so on);

A CORESET in which DCI has been received (for example, a CORESET pool ID of this CORESET, an ID of this CORESET, a scramble ID (may be interpreted as a sequence ID), a resource, and so on; and An RS (an RS related group, for example) used in a TCI state, QCL assumption, spatial relation information, and so on.

In the present disclosure, a single PDCCH (DCI) may be referred to as a PDCCH (DCI) of a first scheduling type (for example, a scheduling type A (or type 1)). A multi PDCCH (DCI) may be referred to as a PDCCH (DCI) of a second scheduling type (for example, a scheduling type B (or type 2)).

In the present disclosure, regarding the single DCI, an i-th TRP (TRP #i) may mean an i-th TCI state, an i-th CDM group (i is an integer), and so on. Regarding the multi DCI, the i-th TRP (TRP #i) may mean a CORESET corresponding to a CORESET pool index of equal to i, the i-th TCI state, the i-th CDM group (i is an integer), and so on.

In the present disclosure, the single PDCCH may be assumed to be supported if the multi TRP uses an ideal backhaul. The multi PDCCH may be assumed to be supported if a non-ideal backhaul is used between multi TRPs.

Note that the ideal backhaul may be referred to as a DMRS port group type 1, a reference signal associated group type 1, an antenna port group type 1, a CORESET pool type 1, and so on. The non-ideal backhaul may be referred to as a DMRS port group type 2, a reference signal associated group type 2, an antenna port group type 2, a CORESET pool type 2, and so on. Names are by no means not limited to these.

In the present disclosure, a multi TRP, a multi TRP system, multi TRP transmission, and a multi PDSCH may be interchangeably interpreted.

In the present disclosure, single DCI (sDCI), a single PDCCH, multi TRP system based on single DCI, an sDCI-based MTRP, and being activated in two TCI states on at least one TCI code point may be interchangeably interpreted.

In the present disclosure, multi DCI (mDCI), a multi PDCCH, multi TRP system based on multi DCI, an mDCI-based MTRP, and configuring two CORESET pool indices or configuring a CORESET pool index to be 1 (or a value of equal to or greater than 1) may be interchangeably interpreted.

In the present disclosure, QCL and QCL type D may be interchangeably interpreted.

Note that the descriptions of the embodiments given below are based on the assumption that the embodiments are applied to a case where UE supports simultaneous receptions of channels/signals of two or more different QCL types D. However, the embodiments may further be applied to other cases.

(Radio Communication Method)

First Embodiment

A first embodiment relates to collision between a PDCCH and a PDSCH. The PDCCH and the PDSCH mentioned in the description of the first embodiment may mean a PDCCH and a PDSCH overlapping each other temporally.

The following describes the case of an mDCI-based MTRP (an embodiment 1.1) and the case of an sDCI-based MTRP (an embodiment 1.2) separately.

Embodiment 1.1

Regarding the mDCI-based MTRP, if a CORESET pool index is configured for a CORESET, a priority rule shown in FIG. 1 may be applied only to a case where the PDCCH and the PDSCH are related to the same CORESET pool index.

If the PDCCH and the PDSCH are related to different CORESET pool indices, the priority rule is not required and UE having capability to receive channels/signals of two different QCL types D simultaneously may receive both the PDCCH and the PDSCH related to the channels/signals of these different QCL types D.

Note that the UE may determine relation between a CORESET pool index and the PDSCH using relation between the CORESET pool index and a PDCCH used for scheduling this PDSCH, or may determine such relation using relation between the CORESET pool index and a PDCCH used by this PDSCH as a destination of reference of QCL (for example, referred to as default QCL).

For example, the UE may determine that a CORESET pool index related to the PDSCH is a CORESET pool index to which a PDCCH for scheduling of this PDSCH is related, or may determine that a PDCCH to be referred to as default QCL for this PDSCH is a related CORESET pool index.

Figure 2:
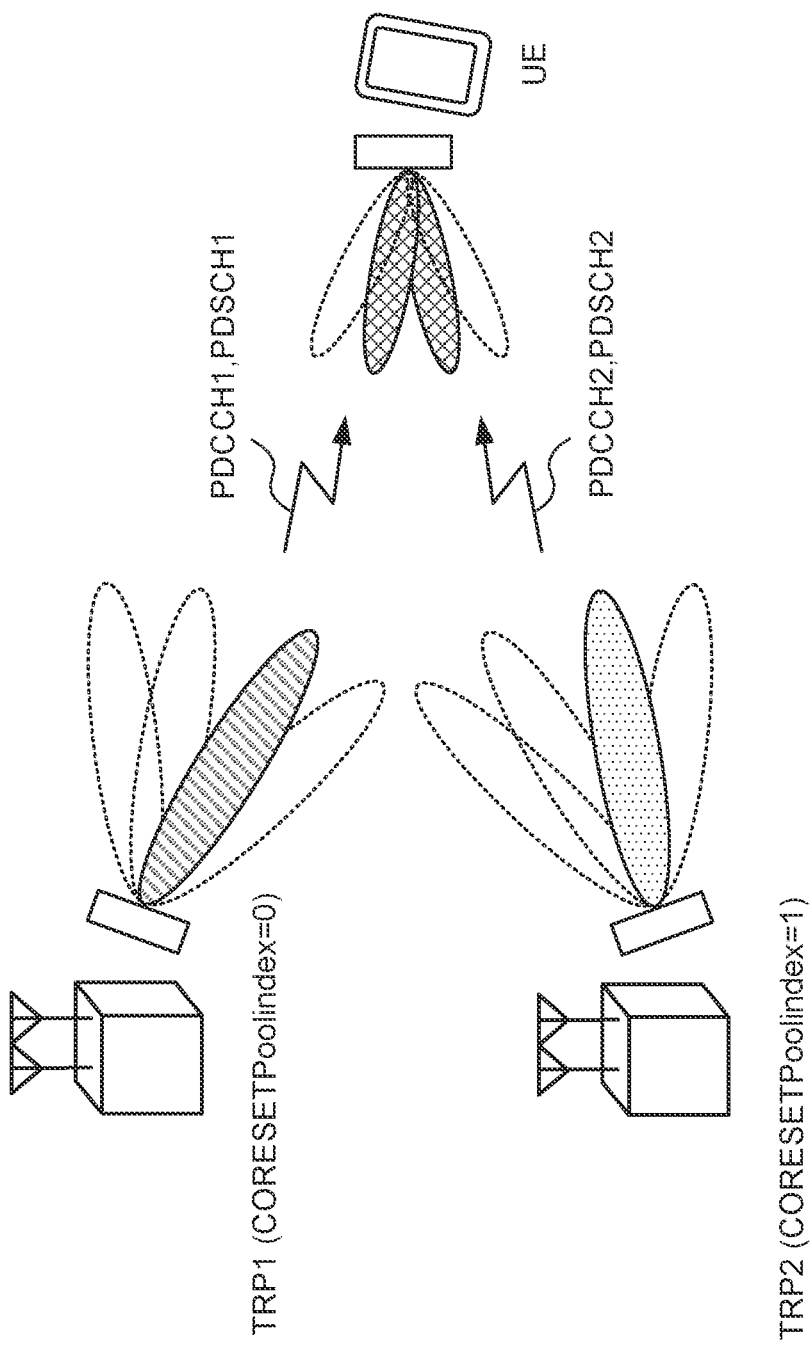
FIG. 2 is a diagram to show an example of an environment of an mDCI-based MTRP for explaining operation according to an embodiment 1.1.

FIG. 2 is a diagram to show an example of an environment of an mDCI-based MTRP for explaining operation according to the embodiment 1.1. In the present example, the UE uses an mDCI-based MTRP employing a TRP 1 and a TRP 2. The TRP 1 falls under a CORESET pool index of equal to 0, and the TRP 2 falls under a CORESET pool index of equal to 1. The TRP 1 is used for transmitting a PDCCH 1 and a PDSCH 1 to the UE. The TRP 2 is used for transmitting a PDCCH 2 and a PDSCH 2 to the UE.

Note that the PDCCH 1 is not limited to a PDCCH (DCI) for scheduling the PDSCH 1 but may mean an arbitrary PDCCH transmitted from the TRP 1. Note that the PDCCH 2 is not limited to a PDCCH (DCI) for scheduling the PDSCH 2 but may mean an arbitrary PDCCH transmitted from the TRP 2.

FIGS. 3A and 3B are diagrams to show examples of a priority rule applied on the occurrence of collision between a PDCCH and a PDSCH according to the embodiment 1.1. As shown in FIG. 2, the PDCCH 1 and the PDSCH 1 correspond to the TRP 1 (a CORESET pool index of equal to 0), and the PDCCH 2 and the PDSCH 2 correspond to the TRP 2 (a CORESET pool index of equal to 1). Furthermore, the PDSCH 1 or the PDSCH 2 of the present example complies with a default TCI state.

Referring to FIG. 3A, the PDCCH 1 and the PDSCH 1 falling under the same CORESET pool index differ from each other in the QCL type D and overlap each other in some symbols. In this case, the UE receives the PDCCH 1 as a priority and does not need to receive the PDSCH 1 overlapping the PDCCH 1 (in the drawing, a blackened part). The UE may receive the PDSCH 1 in a part not overlapping the PDCCH 1.

Referring to FIG. 3B, the PDCCH 1 and the PDSCH 2 falling under different CORESET pool indices differ from each other in the QCL type D and overlap each other in some symbols. In this case, the UE may receive the PDSCH 2 overlapping the PDCCH 1 simultaneously with reception of the PDCCH 1.

Embodiment 1.2

Regarding the sDCI-based MTRP, if a plurality of (two, for example) TCI states is applied for the PDSCH (if such TCI states are indicated by DCI or indicated by default QCL, for example), and if a channel/signal of the QCL type D of a DMRS for a PDCCH is the same as a channel/signal of one QCL type D of those of the plurality of TCI states of a DMRS for the PDSCH, the priority rule is not required and the UE having capability to receive channels/signals of two different QCL types D simultaneously may receive both a PDCCH and a PDSCH related to the channels/signals of these different QCL types D.

If a plurality of TCI states is applied for a PDSCH and if a channel/signal of the QCL type D of a DMRS for a PDCCH differs from a channel/signal of the QCL type D of any of the plurality of TCI states for a DMRS for the PDSCH, the UE may comply with at least one of the following:
(1) To give priority to reception of the PDCCH and not to receive the PDSCH in a symbol overlapping the PDCCH.
(2) To give priority to receptions of the PDCCH and a PDSCH associated with one TCI state of the plurality of TCI states. Not to receive a PDSCH associated with the other TCI state of the plurality of TCI states in a symbol overlapping this PDCCH.

Regarding the TCI state described above in (2) to be given priority for the PDSCH, this TCI state may be defined in advance in specifications, may be configured/activated in the UE by higher layer signaling (for example, by an RRC or MAC CE), or may be determined on the basis of UE capability. Regarding the TCI state described above in (2) to be given priority for the PDSCH, this TCI state may be a TCI state belonging to the plurality of TCI states and having a TCI state ID falling under a specific value (for example, a minimum value or a maximum value).

Figure 4:
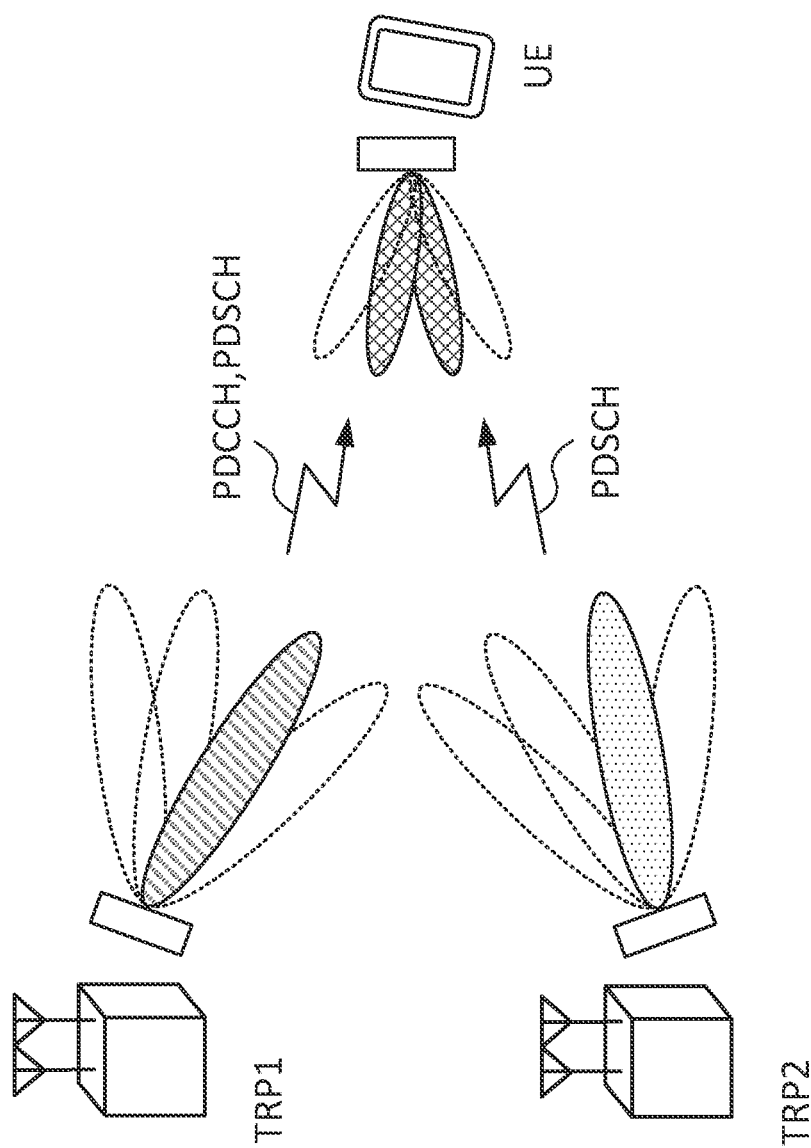
FIG. 4 is a diagram to show an example of an environment of an sDCI-based MTRP for explaining operation according to an embodiment 1.2.

FIG. 4 is a diagram to show an example of an environment of an sDCI-based MTRP for explaining operation according to the embodiment 1.2. In the present example, the UE uses an sDCI-based MTRP employing the TRP 1 and the TRP 2. The TRP 1 is used for transmitting a PDCCH and a PDSCH to the UE. The TRP 2 is used for transmitting a PDSCH (scheduled using the PDCCH from the TRP 1) to the UE.

Note that the PDCCH 1 is not limited to a PDCCH (DCI) for scheduling the PDSCH 1 but may mean an arbitrary PDCCH transmitted from the TRP 1.

If a TCI code point of DCI communicated through a PDCCH indicates a set of two or more TCI states, the UE receives PDSCHs corresponding to different TCI states (for example, transmitted from different TRPs) such as those shown in the drawing. In the present example, it is assumed that a PDSCH from the TRP 1 falls under a TCI state 1 and a PDSCH from the TRP 2 falls under a TCI state 2.

Figures 5A, 5B:
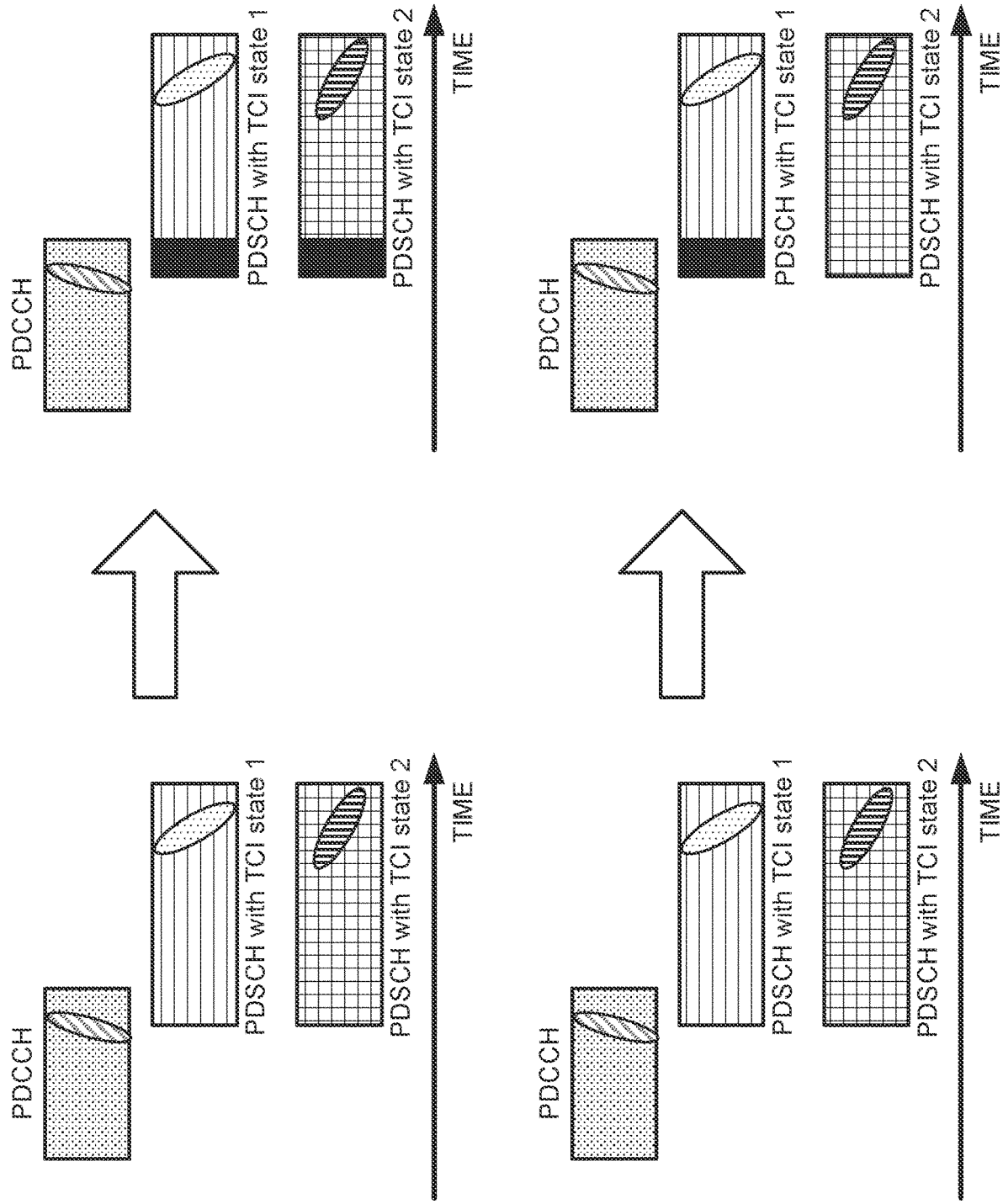
FIGS. 5A and 5B are diagrams to show examples of a priority rule applied on the occurrence of collision between a PDCCH and a PDSCH according to the embodiment 1.2.

FIGS. 5A and 5B are diagrams to show examples of a priority rule applied on the occurrence of collision between a PDCCH and a PDSCH according to the embodiment 1.2. As shown in FIG. 4, the PDCCH and the PDSCH 1 falling under the TCI state 1 correspond to the TRP 1, and the PDSCH falling under the TCI state 2 corresponds to the TRP 2. The QCL type D of this PDCCH is assumed to differ from any of the QCL types D of the PDSCHs (the QCL types D of the TCI states 1 and 2). Furthermore, the PDSCH of the present example may or may not comply with a default TCI state.

Referring to FIG. 5A, the PDCCH differs in the QCL type D from both the PDSCH falling under the TCI state 1 and the PDSCH 2 falling under the TCI state 2, and overlaps both of these PDSCHs in some symbols. In this case, the UE receives the PDCCH as a priority and does not need to receive each of the PDSCHs overlapping the PDCCH (in the drawing, a blackened part). The UE may receive each of the PDSCHs in a part not overlapping the PDCCH.

Referring to FIG. 5B, the PDCCH differs in the QCL type D from both the PDSCH falling under the TCI state 1 and the PDSCH 2 falling under the TCI state 2, and overlaps both of these PDSCHs in some symbols. In the present example, it is assumed that the TCI state of a PDSCH to be given priority is a TCI state belonging to a plurality of TCI states indicated for this PDSCH and having a TCI state ID of a maximum value.

In this case, the UE receives the PDCCH and the PDSCH falling under the TCI state 2 as priorities and does not need to receive the PDSCH falling under the TCI state 1 and overlapping the PDCCH (in the drawing, a blackened part). The UE may receive each PDSCH in a part not overlapping the PDCCH.

The first embodiment described above allows handling of collision between a PDCCH and a PDSCH appropriately.

Second Embodiment

A second embodiment relates to collision between a CSI-RS and a PDCCH (CORESET). The CSI-RS and the PDCCH mentioned in the description of the second embodiment may mean a CSI-RS and a PDCCH overlapping each other temporally. The PDCCH of the present disclosure and a CORESET may be interchangeably interpreted.

The following describes the case of an mDCI-based MTRP (an embodiment 2.1) and the case of an sDCI-based MTRP (an embodiment 2.2) separately.

Embodiment 2.1

Regarding the mDCI-based MTRP, if a CORESET pool index is configured for a CORESET, configuring relation between a CSI-RS resource or an NZP-CSI-RS resource and the CORESET pool index directly (explicitly) or indirectly (implicitly) may be supported.

Regarding a CSI-RS resource associated with an NZP-CSI-RS resource set in which a higher layer parameter about repetition ('repetition') is 'on,' the UE does not need to assume configuration of a CSI-RS related to a given CORESET pool index in a symbol configured to monitor a CORESET associated with the same CORESET pool index. This CSI-RS resource may be located in a symbol overlapping a symbol of a CORESET related to a different CORESET pool index.

Regarding a CSI-RS associated with an NZP-CSI-RS resource set in which a higher layer parameter about repetition ('repetition') is 'on,' the UE may simultaneously receive this CSI-RS and a PDCCH associated with different CORESET pool indices.

Regarding an NZP-CSI-RS resource set not applied to this case (if 'repetition' is not 'on'), if a CSI-RS and a CORESET are related to the same CORESET pool index, the UE may assume that this CSI-RS and a DMRS for a PDCCH to be transmitted in all search space sets associated with this CORESET are quasi-co-located (QCL) according to "QCL type D."

If the CSI-RS and the CORESET are related to different CORESET pool indices, this CSI-RS and a DMRS for a PDCCH for this CORESET may be permitted to fall under different "QCL types D."

Embodiment 2.2

Like in the case of the single TRP, the existing priority rule described above according to Rel. 16 may be applied to the sDCI-based MTRP.

Note that, if the UE is to support simultaneous receptions of QCLs (channels/signals thereof) of a total number of X and if the total number of different QCLs for CSI-RSs and PDCCHs in the same OFDM symbol is equal to or less than X, the UE may receive all of these CSI-RSs and PDCCHs. If this is not the case, the UE does not need to receive all of these CSI-RSs and PDCCHs. If all of these CSI-RSs and PDCCHs are not to be received, the UE may drop (or does not need to receive) at least some of the CSI-RSs and some of the PDCCHs in order for the number of transmissions of different QCLs to be equal to or less than X.

The UE to support simultaneous receptions of QCLs (channels/signals thereof) of the total number of X may expect that the total number of different QCLs for CSI-RSs and PDCCHs in the same OFDM symbol will not exceed X.

If CSI-RSs and PDCCHs of different QCLs and in the same OFDM symbol belong to the same group in terms of first group base beam report, the UE may receive all of these CSI-RSs and PDCCHs. Here, the first group base beam report may be defined by the possibility that beams of the same group can be received simultaneously by the UE. The first group base beam report may be group base beam report intended for Rel. 16/17.

The UE may assume that the above-described existing priority rule according to Rel. 16 is applied to CSI-RSs and PDCCHs belonging to different groups in terms of the first group base beam report.

If CSI-RSs and PDCCHs of different QCLs and in the same OFDM symbol belong to different groups in terms of second group base beam report, the UE may receive all of these CSI-RSs and PDCCHs. Here, the second group base beam report may be defined by the possibility that beams of different groups can be received simultaneously by the UE. The second group base beam report may be group base beam report intended for Rel. 17.

The UE may assume that the above-described existing priority rule according to Rel. 16 is applied to CSI-RSs and PDCCHs belonging to the same group in terms of the second group base beam report.

The second embodiment described above allows handling of collision between a CSI-RS and a PDCCH appropriately.

Third Embodiment

A third embodiment relates to collision between a CSI-RS and an SSB. The CSI-RS and the SSB mentioned in the description of the third embodiment may mean a CSI-RS and an SSB overlapping each other temporally.

The following describes the case of an mDCI-based MTRP (an embodiment 3.1) and the case of an sDCI-based MTRP (an embodiment 3.2) separately.

Embodiment 3.1

Regarding the mDCI-based MTRP, if a CORESET pool index is configured for a CORESET, configuring relation between a CSI-RS resource or an NZP-CSI-RS resource and the CORESET pool index directly (explicitly) or indirectly (implicitly) may be supported. Also, configuring relation between an SSB and the CORESET pool index directly (explicitly) or indirectly (implicitly) may be supported.

If the CSI-RS resource is configured in the same OFDM symbol as the SSB and if these CSI-RS and SSB are related to the same CORESET pool index, the UE may assume that these CSI-RS and SSB are quasi-co-located (QCL) according to "QCL type D."

Furthermore, if the CSI-RS resource is configured in the same OFDM symbol as the SSB and if these CSI-RS and SSB are related to different CORESET pool indices, the UE may assume that these CSI-RS and SSB are subjected to constraints in terms of the QCL type D (for example, these CSI-RS and SSB may be permitted to fall under different "QCL types D.")

Note that, in the present disclosure, configuring relation indirectly between a given channel/signal and a CORESET pool index may mean derivation of relation based on QCL assumption or a TCI state, for example. For example, with CORESET #2 falling under CORESET pool index #1 configured in TCI state #3, SSB #4 being a source reference signal (reference signal) in TCI state #3 implicitly means that SSB #4 is related to CORESET pool index #1.

Embodiment 3.2

Like in the case of the single TRP, the existing priority rule described above according to Rel. 16 may be applied to the sDCI-based MTRP.

Regarding the sDCI-based MTRP, a substance obtained by interpreting "PDCCH" in the embodiment 2.2 as "SSB" may be used. For example, if the UE is to support simultaneous receptions of QCLs (channels/signals thereof) of a total number of X and if the total number of different QCLs for CSI-RSs and SSBs in the same OFDM symbol is equal to or less than X, the UE may receive all of these CSI-RSs and SSBs. If this is not the case, the UE does not need to receive all of these CSI-RSs and SSBs.

The third embodiment described above allows handling of collision between a CSI-RS and an SSB appropriately.

Fourth Embodiment

A fourth embodiment relates to collision between a PDSCH and an SSB. The PDSCH and the SSB mentioned in the description of the fourth embodiment may mean a PDSCH and an SSB overlapping each other temporally. In the fourth embodiment, the PDSCH and a DMRS for the PDSCH may be interchangeably interpreted.

The following describes the case of an mDCI-based MTRP (an embodiment 4.1) and the case of an sDCI-based MTRP (an embodiment 4.2) separately.

Embodiment 4.1

Regarding the mDCI-based MTRP, if a CORESET pool index is configured for a CORESET, configuring relation between an SSB and the CORESET pool index directly (explicitly) or indirectly (implicitly) may be supported.

If a DMRS for a PDSCH is to be received in the same OFDM symbol as an SSB and if these PDSCH and SSB are related to the same CORESET pool index, the UE may assume that these PDSCH and SSB are quasi-co-located (QCL) according to "QCL type D."

Furthermore, if the DMRS for the PDSCH is to be received in the same OFDM symbol as the SSB and if these PDSCH and SSB are related to different CORESET pool indices, the UE may receive both of these PDSCH and SSB about channels/signals of these different QCL types D.

elation between the CORESET pool index and the PDSCH may be determined in the same way as that of the embodiment 1.1.

Embodiment 4.2

Regarding the sDCI-based MTRP, if a plurality of (two, for example) TCI states is applied for the PDSCH (if such TCI states are indicated by DCI or indicated by default QCL, for example), and if the UE is to receive a DMRS for the PDSCH and an SSB in the same OFDM symbol, a channel/signal of one QCL type D of those of the plurality of TCI states for this PDSCH may be assumed to be quasi-co-located (QCL) with the SSB according to "QCL type D."

In other words, the UE may give priority to reception of the SSB and a PDSCH associated with one TCI state of the plurality of TCI states. The UE does not need to receive a PDSCH associated with the other TCI state of the plurality of TCI states in a symbol overlapping this SSB. The TCI state given priority for this PDSCH may be a TCI state belonging to the plurality of TCI states and having a TCI state ID falling under a specific value (for example, a minimum value or a maximum value).

The fourth embodiment described above allows handling of collision between a PDSCH and an SSB appropriately.

Fifth Embodiment

A fifth embodiment relates to collision between an A-CSI-RS and a different DL signal. The A-CSI-RS and the different DL signal mentioned in the description of the fifth embodiment may mean an A-CSI-RS and a different DL signal overlapping each other temporally.

The A-CSI-RS mentioned in the fifth embodiment corresponds to an A-CSI-RS such that scheduling offset of this A-CSI-RS is less than a threshold determined on the basis of beam switch timing reported by UE. The different DL signal mentioned in the fifth embodiment corresponds to "the other DL signal" defied in existing Rel. 15/16. A PDSCH mentioned in the fifth embodiment indicates a PDSCH corresponding to this different DL signal.

The following describes the case of an mDCI-based MTRP (an embodiment 5.1) and the case of an sDCI-based MTRP (an embodiment 5.2) separately.

Embodiment 5.1

Regarding the mDCI-based MTRP, if a CORESET pool index is configured for a CORESET, configuring relation between an A-CSI-RS resource or an A-CSI-RS resource and the CORESET pool index directly (explicitly) or indirectly (implicitly) may be supported.

If the A-CSI-RS and the different DL signal are related to the same CORESET pool index, UE may give priority to QCL for this different DL signal (may apply QCL for the different DL signal to reception of this A-CSI-RS, for example). If this is not the case, the UE may receive both of these A-CSI-RS and different DL signal of different QCL types D.

Relation between the CORESET pool index and the PDSCH may be determined in the same way as that of the embodiment 1.1.

Embodiment 5.2

Regarding the sDCI-based MTRP, if a plurality of (two, for example) TCI states is applied for the PDSCH (if such TCI states are indicated by DCI or indicated by default QCL, for example), and if the UE is to receive a DMRS for the PDSCH and the A-CSI-RS in the same OFDM symbol, the UE may comply with at least one of the following:

If the QCL type D of this A-CSI-RS is the same as one of the plurality of TCI states described above, both the A-CSI-RS and the PDSCH are received. If the QCL type D of this A-CSI-RS differs from any of the plurality of TCI states described above, QCL assumption for a specific TCI state is applied to reception of this A-CSI-RS and the PDSCH, and QCL assumption for the other TCI state of the plurality of TCI states is applied to reception of the other PDSCH. This specific TCI state may belong to the plurality of TCI states and have a TCI state ID falling under a specific value (for example, a minimum value or a maximum value).

Furthermore, regarding the sDCI-based MTRP, a substance obtained by interpreting "CSI-RS" in the embodiment 2.2 as "A-CSI-RS" and interpreting "PDCCH" in the embodiment 2.2 as "different DL signal" may be used. For example, if the UE is to support simultaneous receptions of QCLs (channels/signals thereof) of a total number of X and if the total number of different QCLs for A-CSI-RSs and different DL signals in the same OFDM symbol is equal to or less than X, the UE may receive all of these A-CSI-RSs and different DL signals. If this is not the case, the UE does not need to receive all of these A-CSI-RSs and different DL signals.

Figure 6:
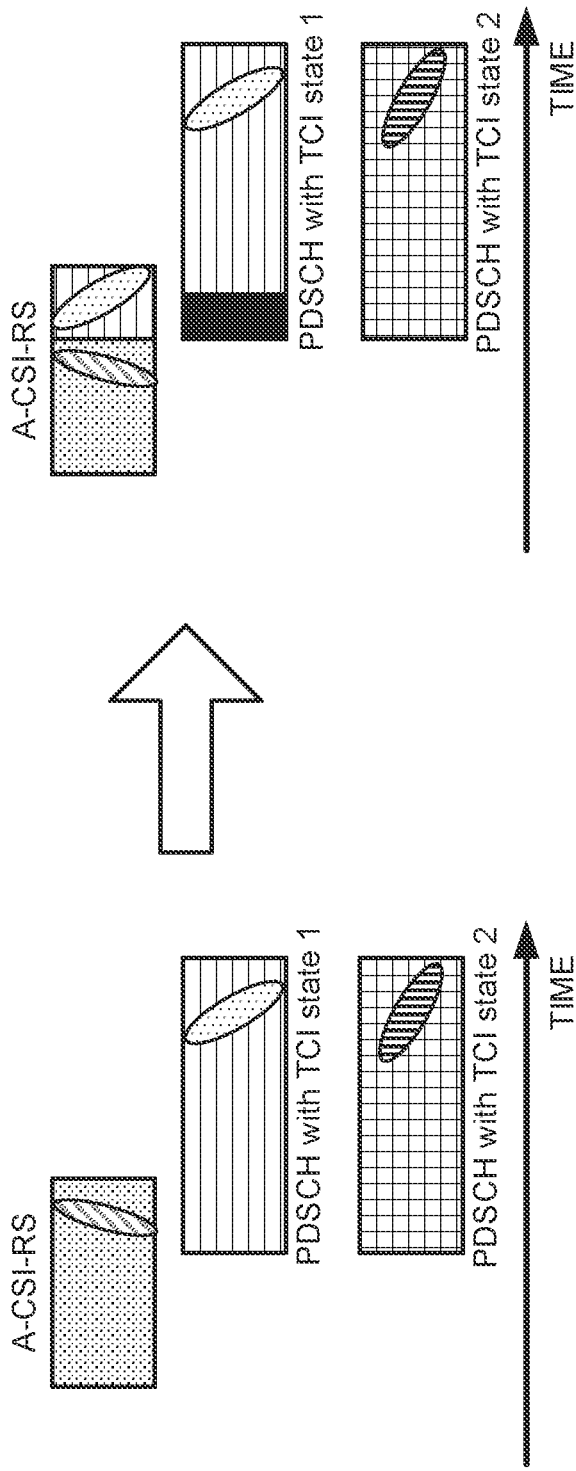
FIG. 6 is a diagram to show an example of a priority rule applied on the occurrence of collision between an A-CSI-RS and a different DL signal (PDSCH) according to an embodiment 5.2.

FIG. 6 is a diagram to show an example of a priority rule applied on the occurrence of collision between the A-CSI-RS and the different DL signal (PDSCH) according to the embodiment 5.2. In the present example, the A-CSI-RS differs in the QCL type D from both the PDSCH falling under the TCI state 1 and the PDSCH 2 falling under the TCI state 2, and overlaps both of these PDSCHs in some symbols. The QCL type D of this A-CSI-RS is assumed to differ from the QCL type D of any PDSCH (QCL types D of the TCI states 1 and 2). Furthermore, the PDSCH of the present embodiment may or may not comply with a default TCI state.

In the present example, it is assumed that the above-described specific TCI state (the TCI state of the PDSCH to be given priority) is a TCI state belonging to a plurality of TCI states indicated for the PDSCH overlapping the A-CSI-RS and having a TCI state ID of a maximum value.

In this case, the UE applies the TCI state 1 for receptions of the A-CSI-RS and the PDSCH in a symbol in which these A-CSI-RS and PDSCH overlap each other. The UE further applies the TCI state 2 for reception of this PDSCH.

Note that, while the TCI state 1 of the present example is not applied to the A-CSI-RS in a part not overlapping the PDSCH, it may be applied to this part of the A-CSI-RS.

The fifth embodiment described above allows handling of collision between an A-CSI-RS and a different DL signal appropriately.

<Others>

In the examples according to the above-described embodiments, if a CORESET pool index is configured in a CORESET, the UE assumes that a different channel/RS related to the same CORESET pool index is of the same QCL-D, and assumes that a different channel/RS related to a different CORESET pool index is of different QCL-D.

In the examples according to the above-described embodiments, with a plurality of TCI states applied to a PDSCH, the UE receives both the PDSCH and a different DL channel/signal if one of the plurality of TCI states and the different DL channel fall under the same QCL-D. If this is not the case, the UE gives priority to any one of these TCI states.

Note that at least one of the above-described embodiments may be applied only to the UE having reported specific UE capability or the UE supporting such specific UE capability.

Such specific UE capability may indicate at least one of the following:
Whether to support simultaneous receptions;
Whether to support simultaneous receptions of channels/signals of two or more different QCL types D; and
The number of QCLs for simultaneous receptions in one OFDM symbol.

Capability of whether to support simultaneous receptions may be defined independently for each of the above-described embodiments or may be defined commonly between some of the embodiments. For example, capability may be defined to indicate that simultaneous receptions of any two of a PDCCH, a PDSCH, a CSI-RS, an SSB, and an A-CSI-RS (any two may be the same cannels/signals) are to be supported. As another example, capability indicating that simultaneous receptions of PDSCHs are to be supported may indicate that processing relating to simultaneous receptions described in the first embodiment (collision between a PDCCH and a PDSCH) and the fourth embodiment (collision between a PDSCH and an SSB) is to be supported.

Capability relating to the number of QCLs for simultaneous receptions in one OFDM symbol may be defined for each bandwidth part (BWP)/each CC (component carrier)/each band. Alternatively, it may be defined over all CCs or may be defined over all bands. If definition is made over all CCs/all bands, "one OFDM symbol" described above may be defined to mean a specific subcarrier spacing (SCS). This specific SCS may be a smaller (or larger) SCS among SCSs available (or configured) in all the CCs/all the bands, and may be 15 kHz, for example.

Note that "CSI-RS," "A-CSI-RS," "SSB," and so on in the present disclosure may be interpreted as a radio link monitoring RS (RLM-RS), a beam failure detection RS (BFD-RS), an RS for beam management, and so on.

Furthermore, at least one of the above-described embodiments may be applied to a case where specific information associated with the above-described embodiments is configured in the UE by higher layer signaling (in the absence of the configuration, operation according to Rel. 15/16 is applied, for example). For example, such specific information may be information indicating that different spatial relations are to be enabled for PUSCH repetition or may be an arbitrary RRC parameter intended for a specific resource (Rel. 17, for example).

Note that each of the above-described embodiments may be applied to a case where the UE is configured with a multi TRP or a multi-panel (operation thereof), or may be applied to other cases.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
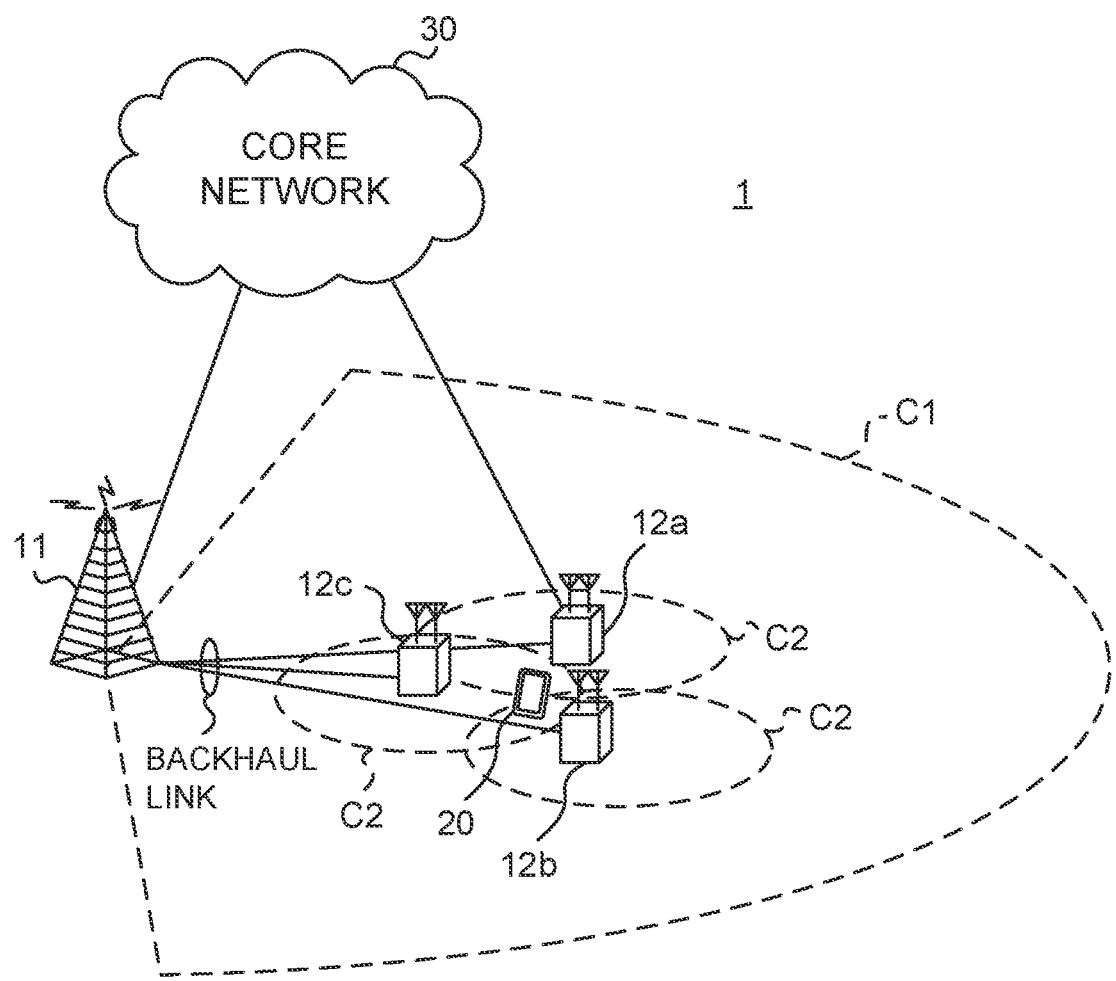
FIG. 7 is a diagram to show an example of a schematic structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-PAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same PAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform."

Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 8:
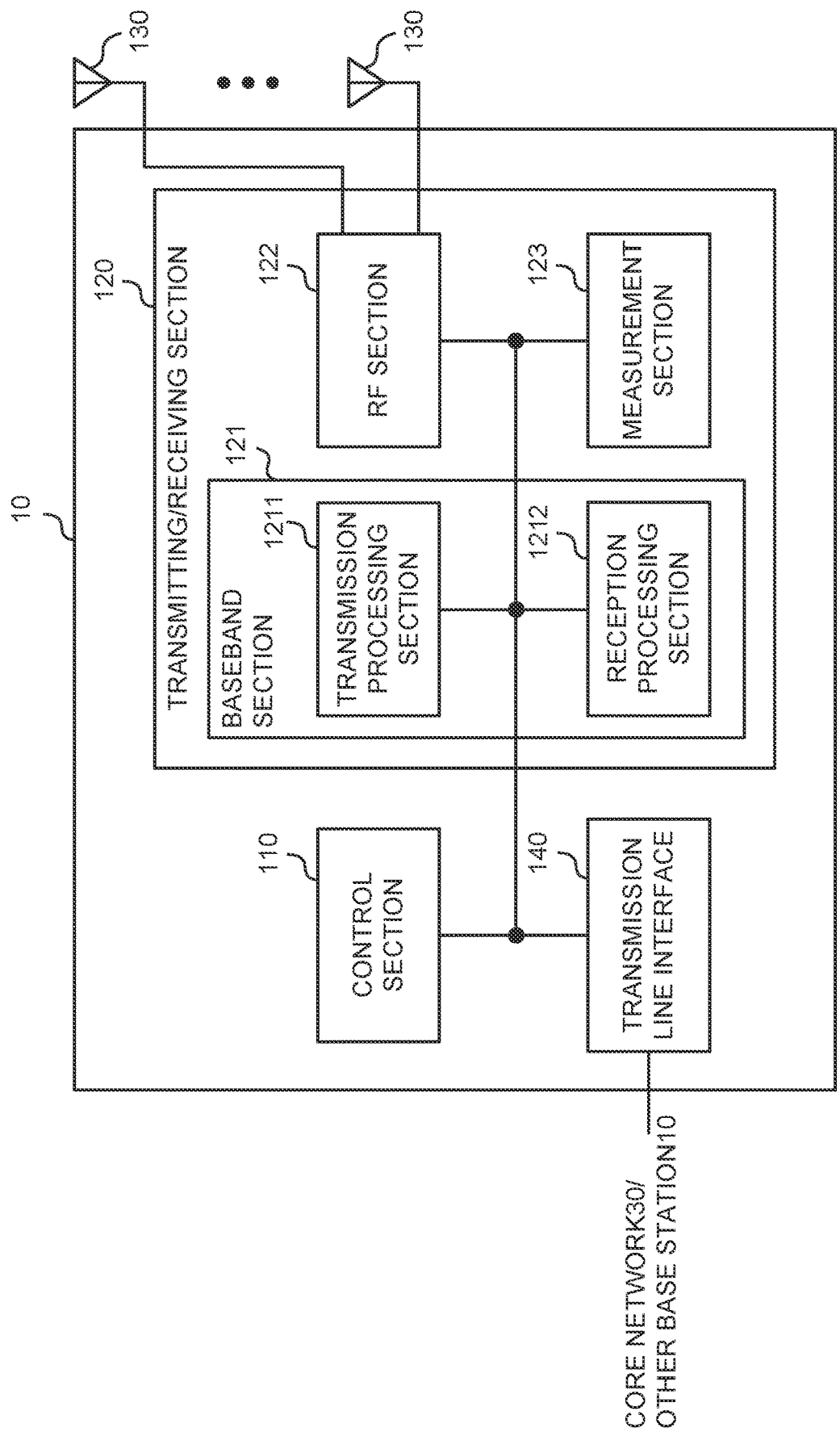
FIG. 8 is a diagram to show an example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit at least one of a downlink shared channel (Physical Downlink Shared Channel (PDSCH)) and a downlink control channel (Physical Downlink Control Channel (PDCCH)) overlapping each other to the user terminal 20.

The control section 110 may perform control of causing the user terminal 20 to transmit both the PDSCH and the PDCCH if a specific condition is satisfied.

The transmitting/receiving section 120 may transmit the downlink control channel (Physical Downlink Control Channel (PDCCH)) in a control resource set (CORESET) to the user terminal 20.

The control section 110 may perform control on the assumption that the user terminal 20 does not assume that a CSI-RS resource associated with a non zero power channel state information reference signal (NZP-CSI-RS) resource set in which a higher layer about repetition is on and related to a CORESET pool index same as a CORESET pool index of the CORESET is configured for a symbol configured to monitor the CORESET.

Furthermore, the transmitting/receiving section 120 may transmit an aperiodic channel state information-reference signal (A-CSI-RS) to the user terminal 20.

If scheduling offset at the user terminal 20 between reception of a downlink control channel for communication of downlink control information for scheduling the A-CSI-RS and reception of the A-CSI-RS is less than a threshold determined on the basis of a period value for beam switch reported by the user terminal 20, if there is a different downlink signal in the same symbol as the A-CSI-RS, and if these A-CSI-RS and different downlink signal are related to the same control resource set (CORESET) pool index, the control section 110 may assume that the user terminal 20 gives priority to quasi-co-location (QCL) for the different downlink signal.

(User Terminal)

Figure 9:
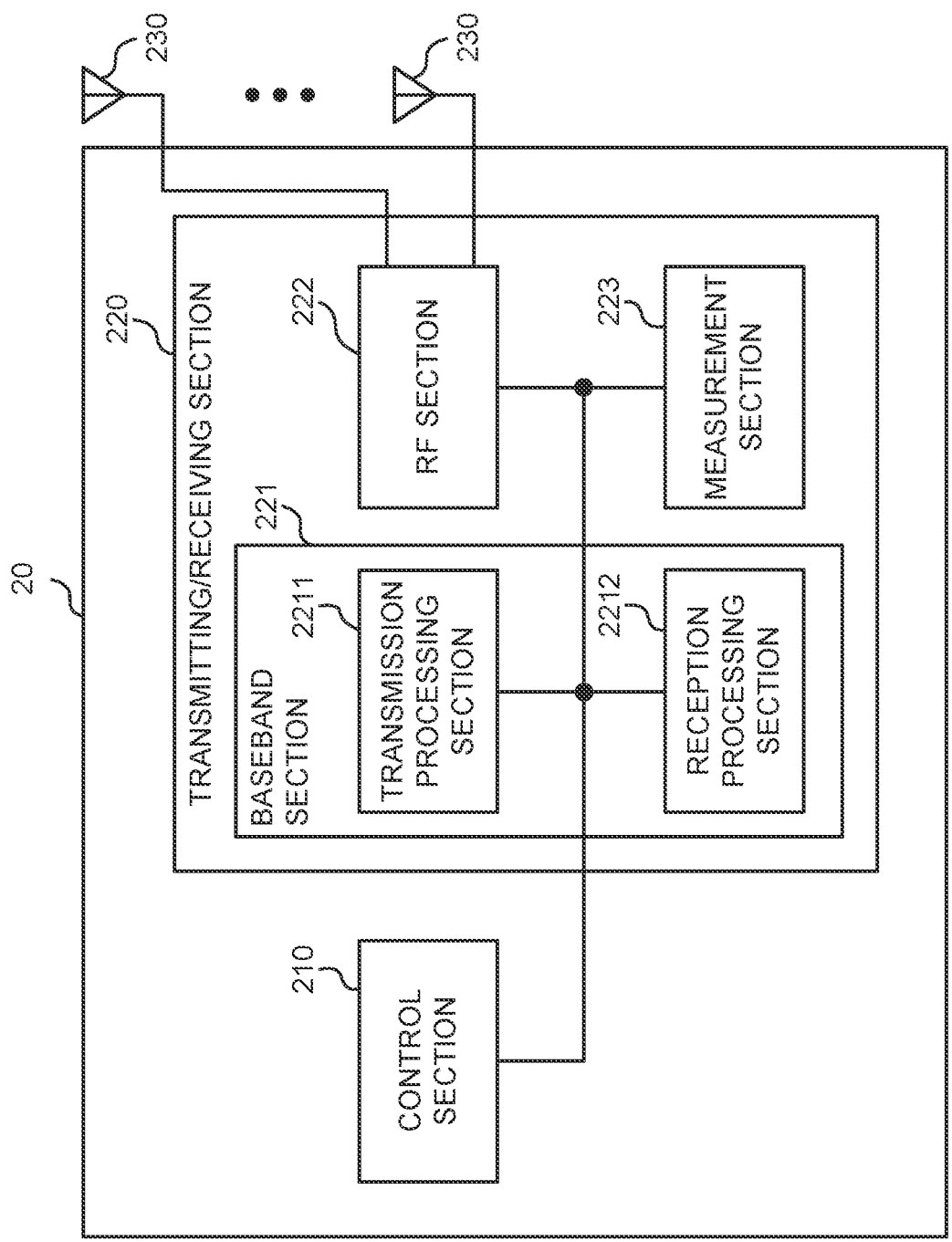
FIG. 9 is a diagram to show an example of a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may perform control of receiving both a downlink shared channel (Physical Downlink Shared Channel (PDSCH)) and a downlink control channel (Physical Downlink Control Channel (PDCCH)) overlapping each other if a specific condition is satisfied.

If the specific condition is not satisfied, the transmitting/receiving section 220 may give priority to reception of the PDCCH.

Here, the specific condition may define that a quasi-co-location (QCL) type D of a demodulation reference signal (DMRS) for the PDSCH differs from a QCL type D of a DMRS for the PDCCH, and that the PDSCH and the PDCCH are related to different control resource set (CORESET) pool indices.

The specific condition may define that a plurality of transmission configuration indication states (TCI states) is configured for the PDSCH, and that a quasi-co-location (QCL) type D of a demodulation reference signal (DMRS) for the PDCCH is the same as one QCL type D of those of the plurality of TCI states.

If the specific condition is not satisfied, the transmitting/receiving section 220 may give priority to receptions of the PDCCH and the PDSCH associated with one TCI state of the plurality of TCI states.

The transmitting/receiving section 220 may monitor a downlink control channel (Physical Downlink Control Channel (PDCCH)) in a control resource set (CORESET).

The control section 210 does not need to assume that a CSI-RS resource associated with a non zero power channel state information reference signal (NZP-CSI-RS) resource set in which a higher layer parameter about repetition is on and related to a CORESET pool index same as a CORESET pool index of the CORESET is configured for a symbol configured to monitor the CORESET.

Regarding a CSI-RS resource associated with an NZP-CSI-RS resource set in which the higher layer parameter about repetition is off and related to the same CORESET pool index as the CORESET pool index of the CORESET, the control section 210 may assume that this CSI-RS resource and a demodulation reference signal (DMRS) for a PDCCH to be transmitted in all search space sets associated with the CORESET are quasi-co-located (QCL) according to a quasi-co-location (QCL) type D.

If a PDCCH and a CSI-RS in the same symbol fall under different quasi-co-locations (QCLs) and belong to the same group in terms of first group base beam report, the control section 210 may receive all these CSI-RS and PDCCH.

If a PDCCH and a CSI-RS in the same symbol fall under different quasi-co-locations (QCLs) and belong to different groups in terms of second group base beam report, the control section 210 may receive all these CSI-RS and PDCCH.

If scheduling offset between reception of a downlink control channel for communication of downlink control information for scheduling an aperiodic channel state information-reference signal (A-CSI-RS) and reception of the A-CSI-RS is less than a threshold determined on the basis of a reported period value for beam switch, if there is a different downlink signal in the same symbol as the A-CSI-RS, and if these A-CSI-RS and different downlink signal are related to the same control resource set (CORESET) pool index, the control section 210 may give priority to quasi-co-location (QCL) for the different downlink signal.

The transmitting/receiving section 220 may receive the above-described A-CSI-RS.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
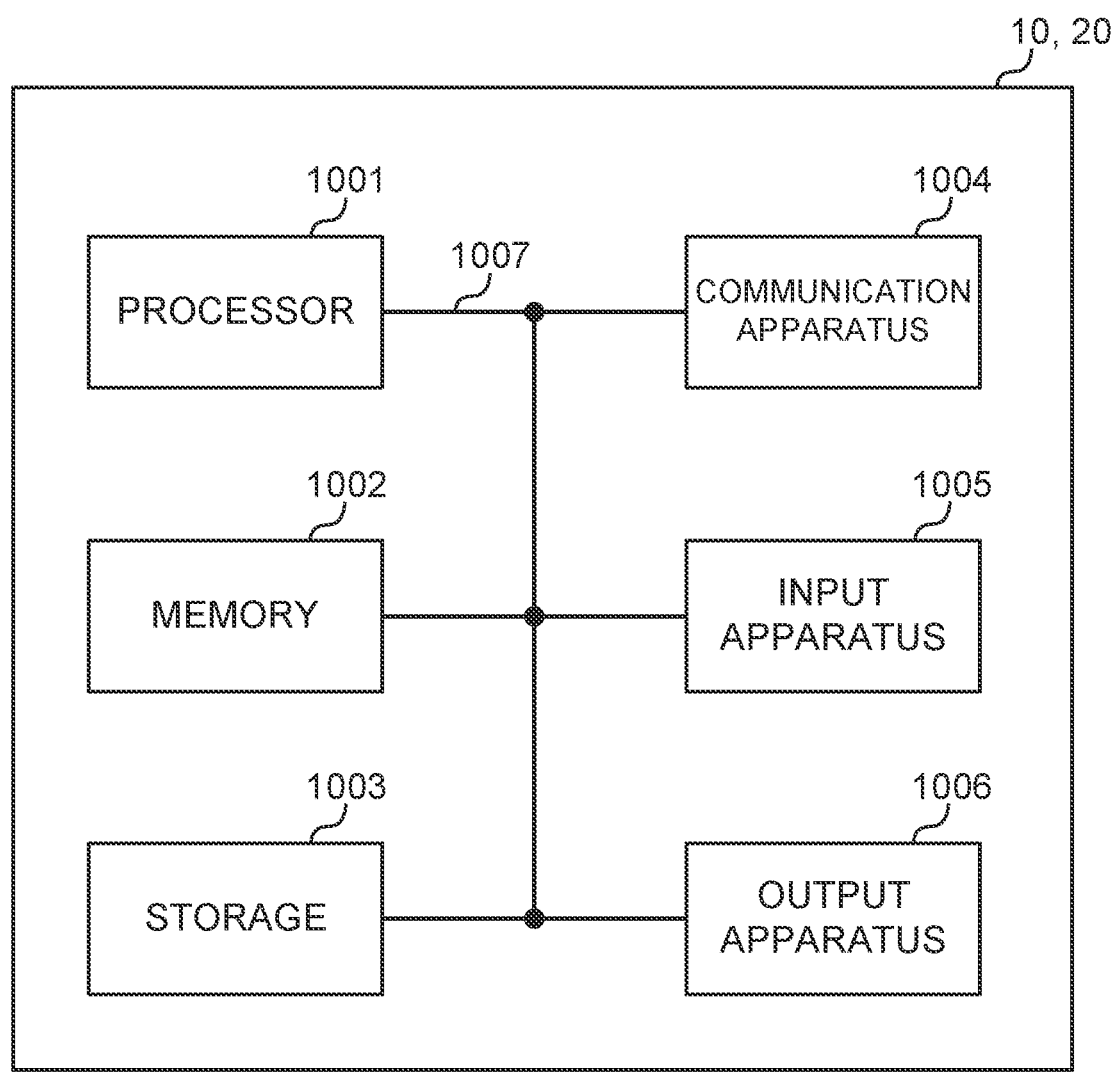
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages."

A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe."

Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MEEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, integer, decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C."

The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a transmitter that transmits capability information indicating support of simultaneous reception of signals of different spatial reception parameters; and
a processor that:
when;
the transmitter transmits the capability information, a first physical downlink control channel (PDCCH) that schedules a first physical downlink shared channel (PDSCH) and a second PDSCH, the first PDSCH, and the second PDSCH overlap in at least one symbol, and
a spatial reception parameter of a demodulation reference signal (DMRS) for the first PDCCH differs from both of a spatial reception parameter of a first transmission configuration indication (TCI) state for the first PDSCH and a QCL type for a spatial reception parameter of a second TCI state for the second PDSCH,
controls to prioritize reception of the single first PDCCH; and
when:
the transmitter transmits the capability information, a second PDCCH and a third PDSCH overlap in at least one symbol,
a spatial reception parameter of a DMRS for the third PDSCH differs from a spatial reception parameter of a DMRS for the second PDCCH, and
the second PDCCH and the third PDSCH are associated with a same value of a control resource set (CORESET) pool index,
controls to prioritize reception of the second PDCCH.

2. The terminal according to claim 1, wherein when:
the first PDCCH, the first PDSCH, and the second PDSCH overlap in the at least one symbol, and
the spatial reception parameter of the DMRS for the first PDCCH is same as the spatial reception parameter of the first TCI state and differs from the spatial reception parameter of the second TCI state,
the processor controls to receive the first PDCCH, the first PDSCH, and the second PDSCH.

3. The terminal according to claim 2, wherein when:
the transmitter transmits the capability information
the first PDCCH, the first PDSCH, and the second PDSCH overlap in the at least one symbol, and
the spatial reception parameter of the DMRS for the first PDCCH is same as the spatial reception parameter of the first TCI state and differs from the spatial reception parameter of the second TCI state,
the processor controls to receive the first PDCCH, the first PDSCH, and the second PDSCH.

4. A radio communication method for a terminal, comprising:
transmitting capability information indicating support of simultaneous reception of signals of different spatial reception parameters;
when:
the capability information is transmitted,
a first physical downlink control channel (PDCCH) that schedules a first physical downlink shared channel (PDSCH) and a second PDSCH, the first PDSCH, and the second PDSCH overlap in at least one symbol, and
a spatial reception parameter of a demodulation reference signal (DMRS) for the first PDCCH differs from both of a spatial reception parameter of a first transmission configuration indication (TCI) state for the first PDSCH and a spatial reception parameter of a second TCI state for the second PDSCH, controlling to prioritize reception of the first PDCCH; and when:
the capability information is transmitted,
a second PDCCH and a third PDSCH overlap in at least one symbol,
a spatial reception parameter of a DMRS for the third PDSCH differs from a spatial reception parameter of a DMRS for the second PDCCH, and
the second PDCCH and the third PDSCH are associated with a same value of a control resource set (CORESET) pool index,
controlling to prioritize reception of the second PDCCH.

5. A base station comprising:
a receiver that receives capability information indicating support of simultaneous reception of signals of different spatial reception parameters; and
a processor that:
when:
the receiver receives the capability information,
a first physical downlink control channel (PDCCH) that schedules a first physical downlink shared channel (PDSCH) and a second PDSCH, the first PDSCH, and the second PDSCH overlap in at least one symbol, and
a spatial reception parameter of a demodulation reference signal (DMRS) for the first PDCCH differs from both of a spatial reception parameter of a first transmission configuration indication (TCI) state for the first PDSCH and a spatial reception parameter of a second TCI state for the second PDSCH,
controls a terminal to prioritize reception of the first PDCCH; and
when:
the receiver receives the capability information,
a second PDCCH and a third PDSCH overlap in at least one symbol,
a spatial reception parameter of a DMRS for the third PDSCH differs from a spatial reception parameter of a DMRS for the second PDCCH, and
the second PDCCH and the third PDSCH are associated with a same value of a control resource set (CORESET) pool index,
controls a terminal to prioritize reception of the second PDCCH.

6. A system comprising a terminal and a base station, wherein
the terminal comprises:
a transmitter that transmits capability information indicating support of simultaneous reception of signals of different spatial reception parameters; and
a processor that:
when:
the transmitter transmits the capability information,
a first physical downlink control channel (PDCCH) that schedules a first physical downlink shared channel (PDSCH) and a second PDSCH, the first PDSCH, and the second PDSCH overlap in at least one symbol, and
a spatial reception parameter of a demodulation reference signal (DMRS) for the first PDCCH differs from both of a spatial reception parameter of a first transmission configuration indication (TCI) state for the first PDSCH and a spatial reception parameter of a second TCI state for the second PDSCH,
controls to prioritize reception of the first PDCCH; and
when:
the transmitter transmits the capability information,
a second PDCCH and a third PDSCH overlap in at least one symbol,
a spatial reception parameter of a DMRS for the third PDSCH differs from a spatial reception parameter of a DMRS for the second PDCCH, and
the second PDCCH and the third PDSCH are associated with a same value of a control resource set (CORESET) pool index,
controls to prioritize reception of the second PDCCH; and
the base station comprises:
a receiver that receives the capability information.

* * * * *